United States Patent [19]
Krakirian

[11] Patent Number: 6,064,247
[45] Date of Patent: May 16, 2000

[54] MULTIPLE FREQUENCY CLOCK GENERATION AND SYNCHRONIZATION

[75] Inventor: Shahe H. Krakirian, Milpitas, Calif.

[73] Assignee: Adaptec, Inc., Milpitas, Calif.

[21] Appl. No.: 09/072,916

[22] Filed: May 4, 1998

[51] Int. Cl.[7] .................................................. G06F 1/04
[52] U.S. Cl. ..................... 327/295; 327/115; 327/145; 327/151; 327/175; 377/47
[58] Field of Search .................... 327/145, 151, 327/115, 175, 295; 377/47

[56] References Cited

U.S. PATENT DOCUMENTS 5,365,119  11/1994  Kivari ......................................... 377/47

*Primary Examiner*—Margaret R. Wambach
*Attorney, Agent, or Firm*—Skjerven, Morrill, MacPherson, Franklin & Friel LLP; Edward C. Kwok; Fabio E. Marino

[57] ABSTRACT

A method and apparatus for generating multiple frequency clock signals using a single input clock signal are provided. Each clock signal generated has a cycle time that is an integer multiple of the input clock cycle time. The fastest clock signal, i.e., the clock signal with the highest frequency generated has the same cycle time as the input clock. The rising edges of all the clock signals generated are synchronized and each clock signal generated has an approximate duty cycle of 50%. This is achieved by first applying the input clock signal to an input terminal of a plurality of registers and of a frequency control module of the signal generator, presenting control signals to input terminals of the registers and of the frequency control module, and generating a plurality of output clock signals in the frequency control module, dependent on the input clock signal and on the control signals.

6 Claims, 17 Drawing Sheets

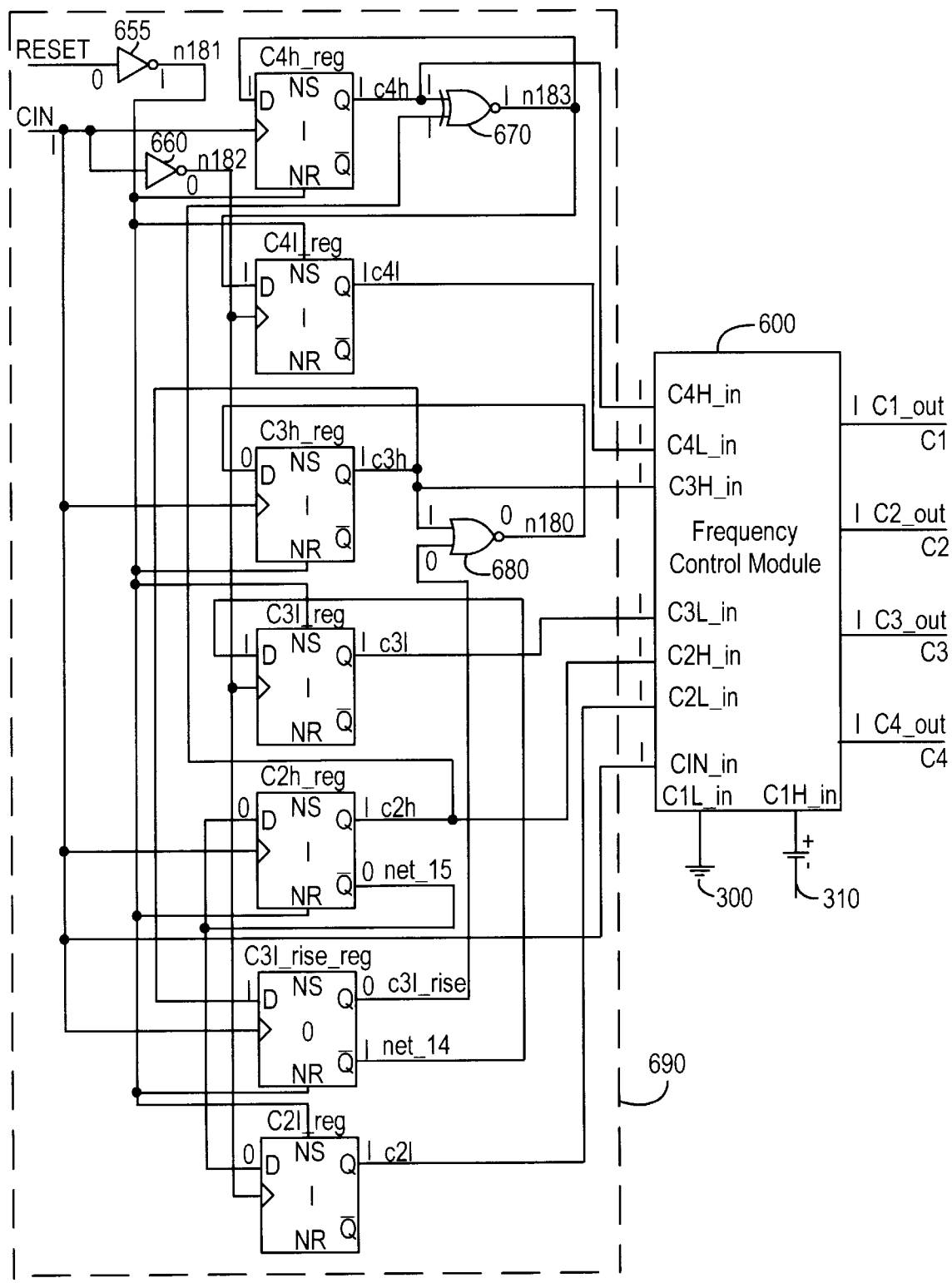
Fig. 6B1

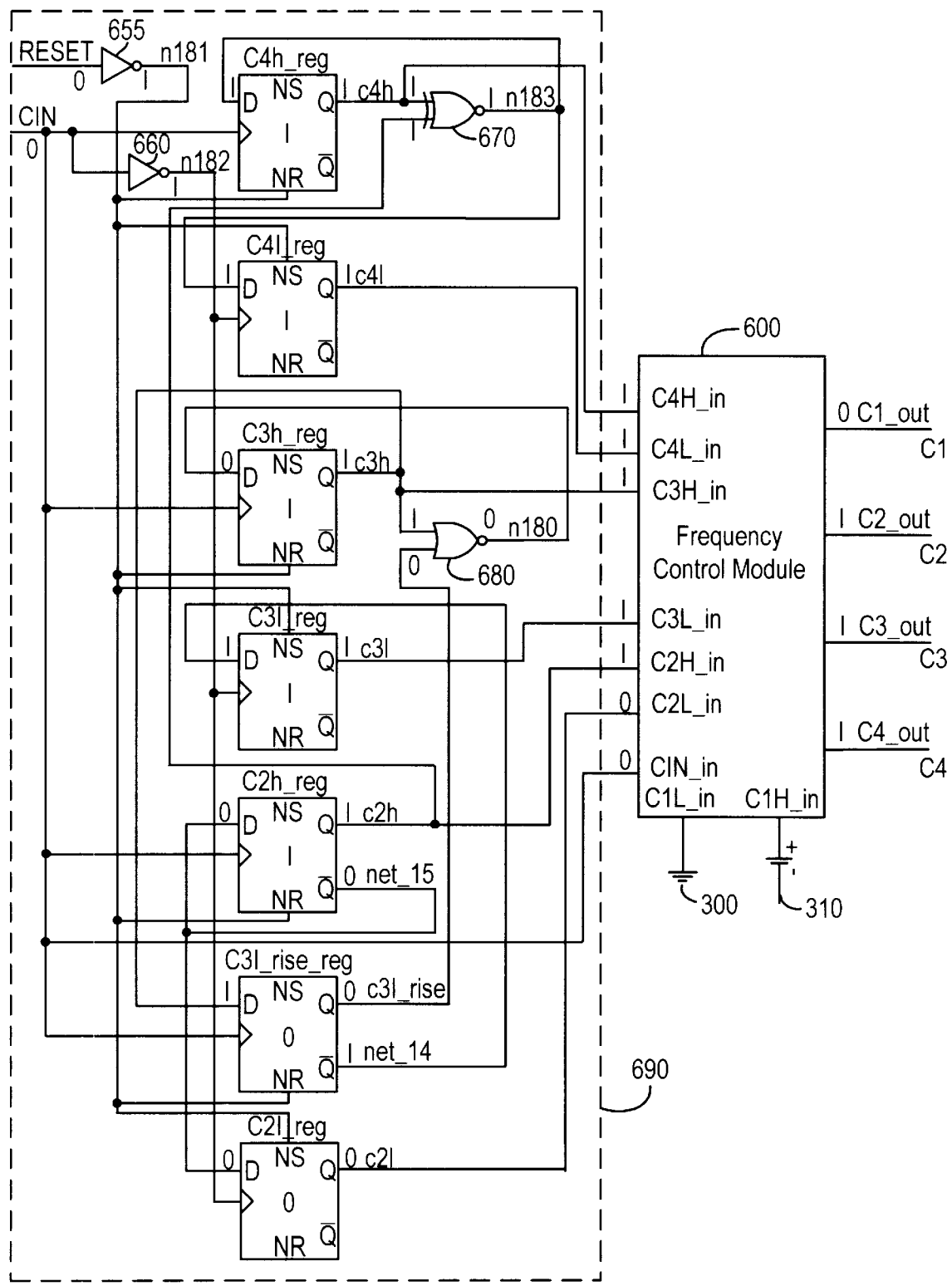
Fig. 6B2

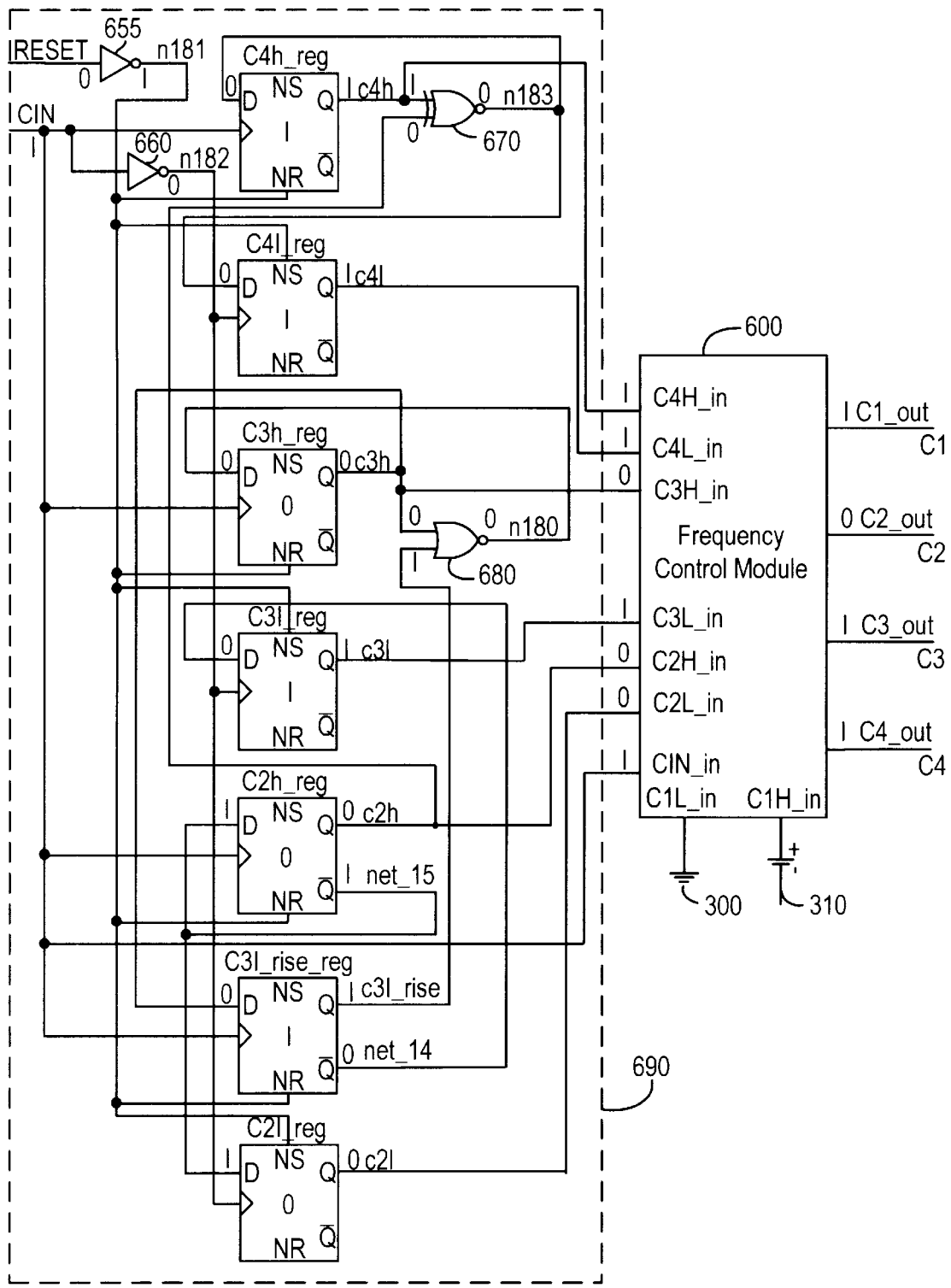
Fig. 6C1

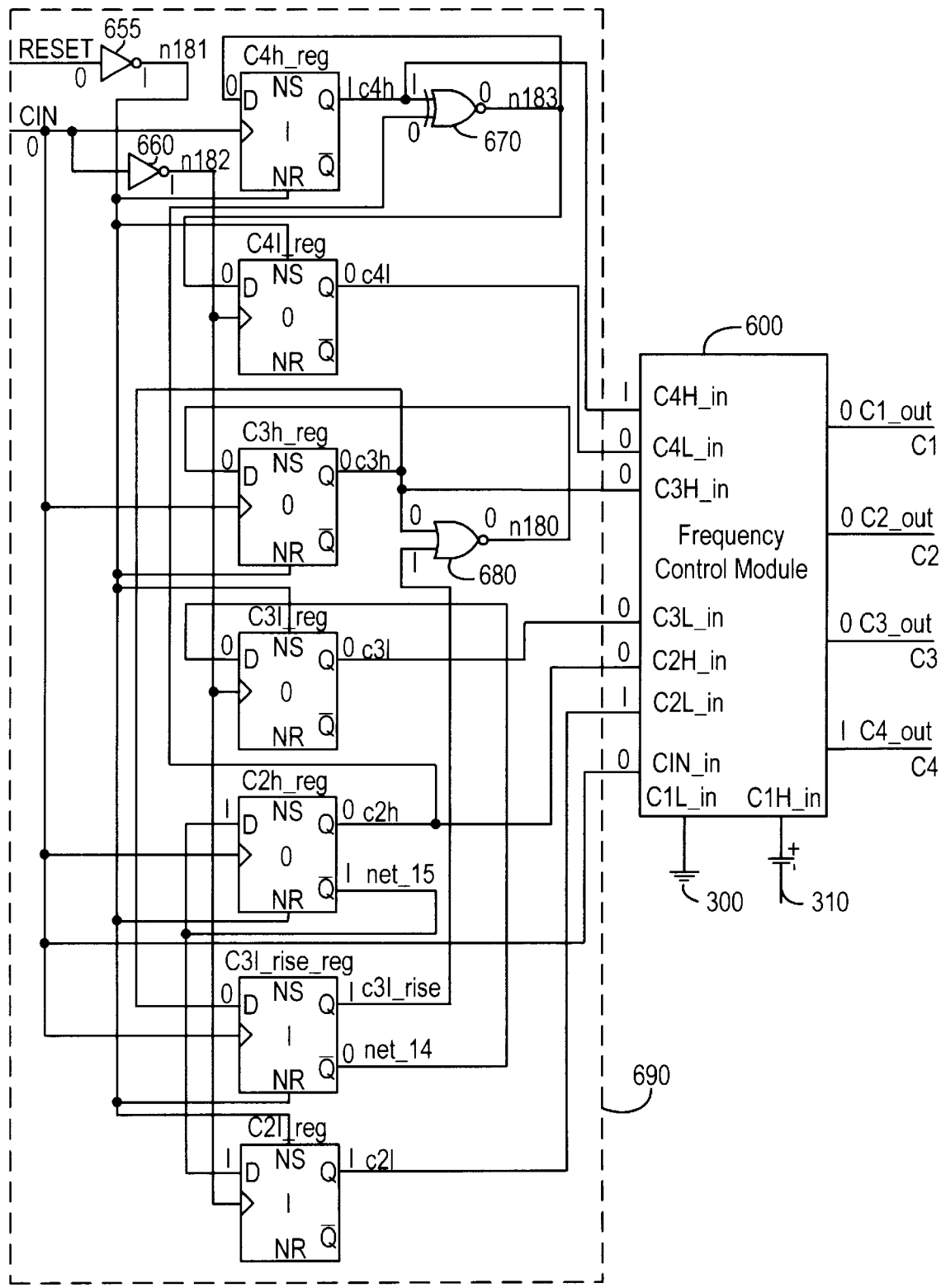
Fig. 6C2

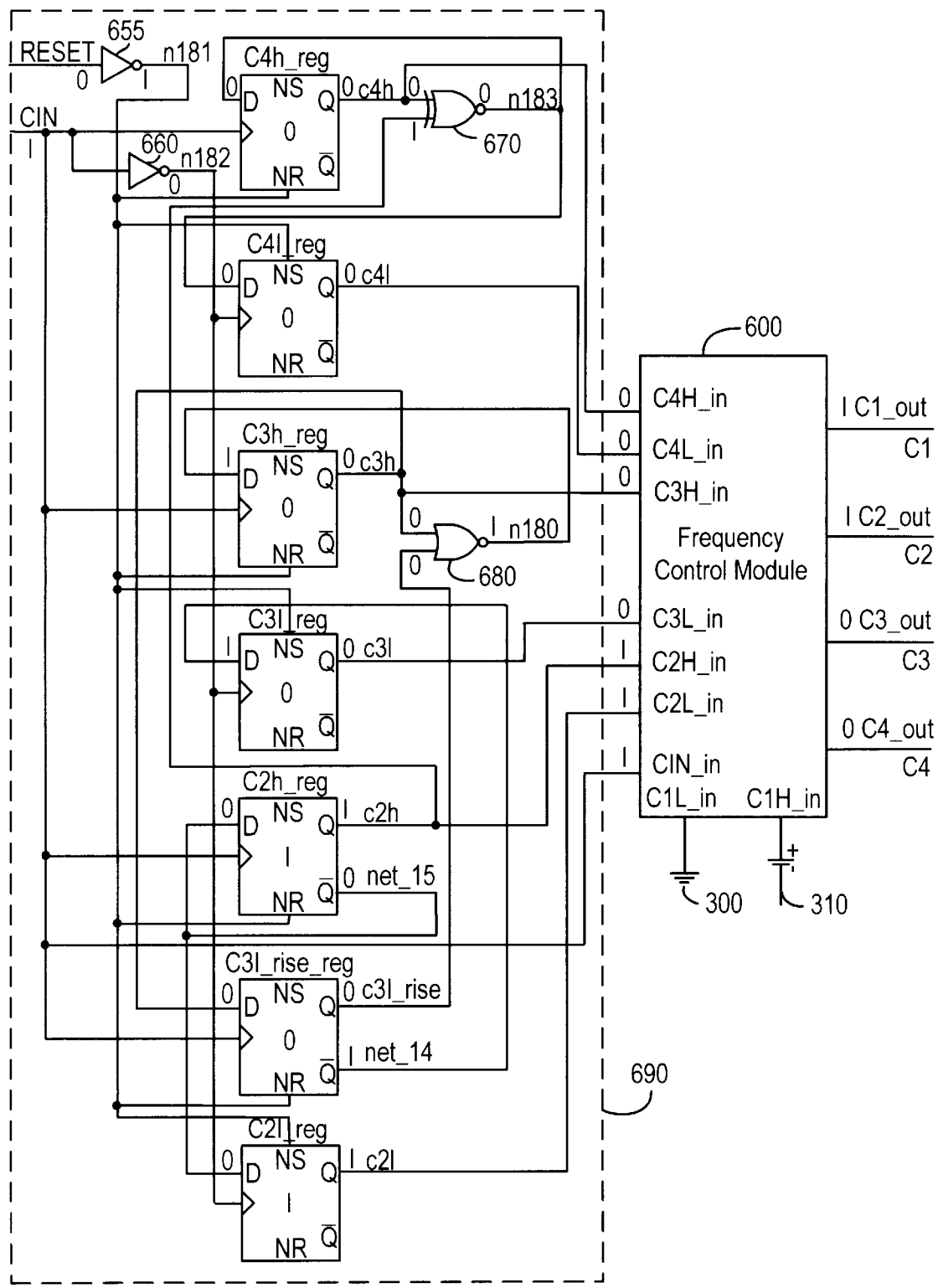
Fig. 6D1

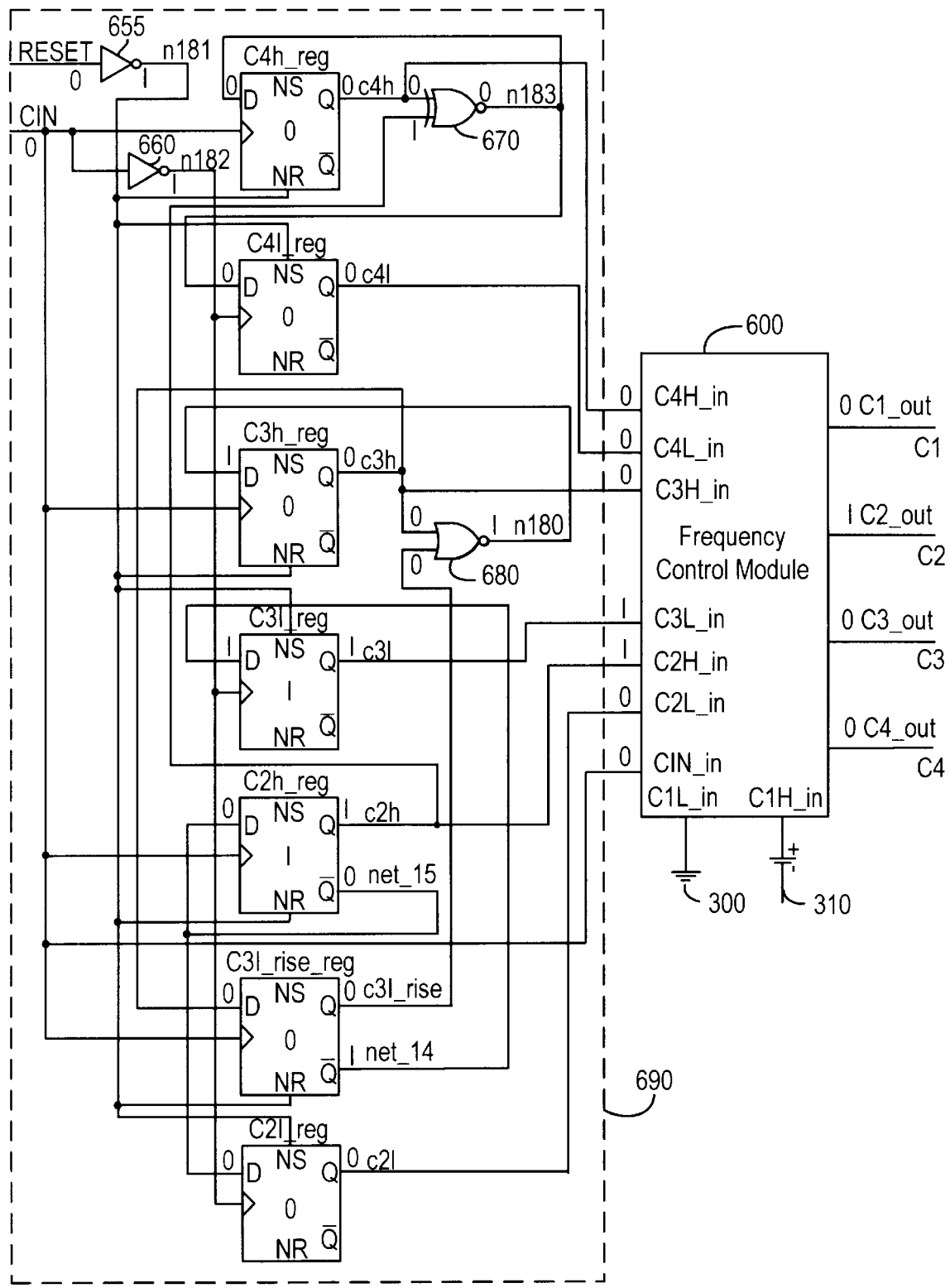
Fig. 6D2

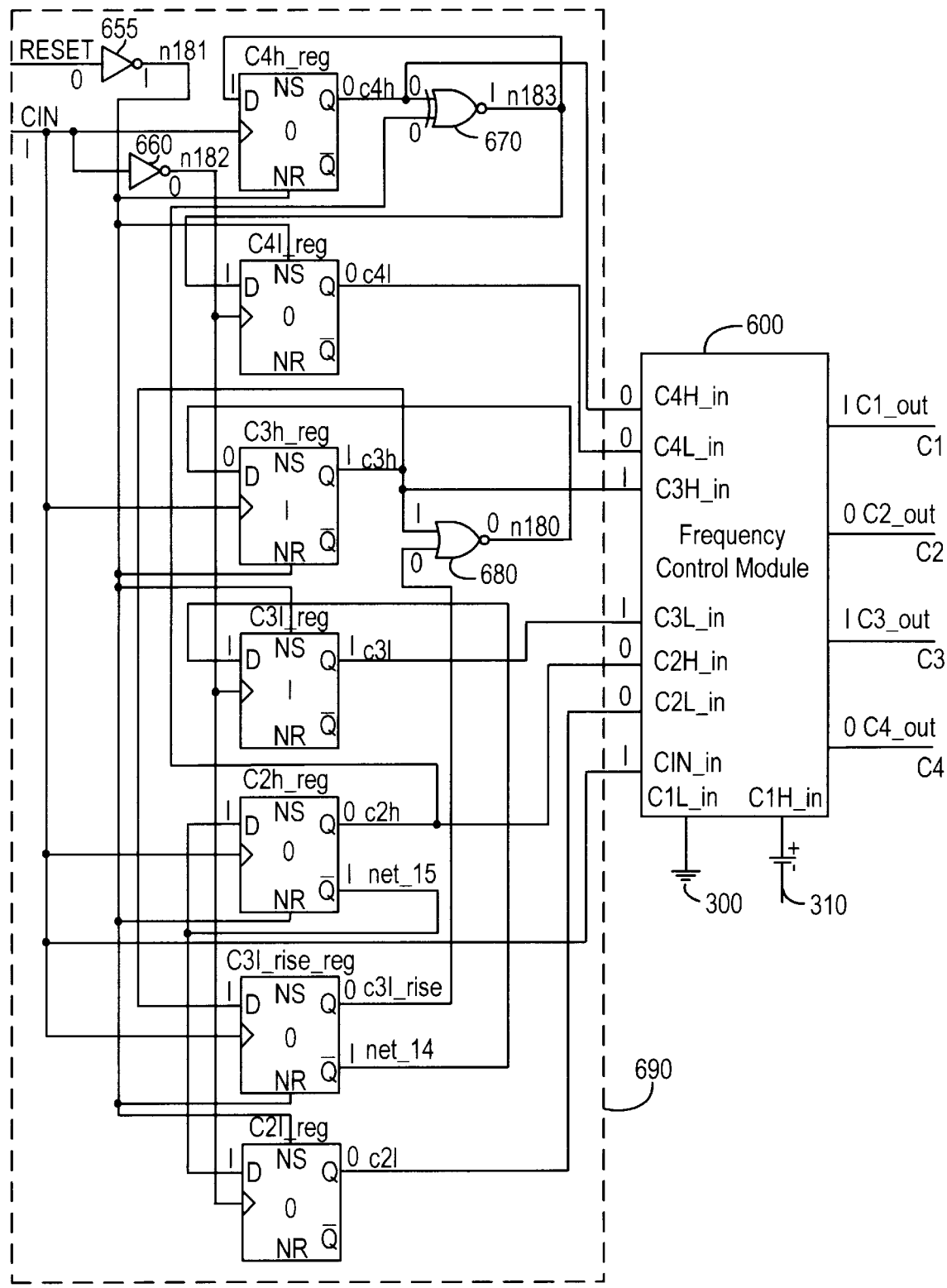
Fig. 6E1

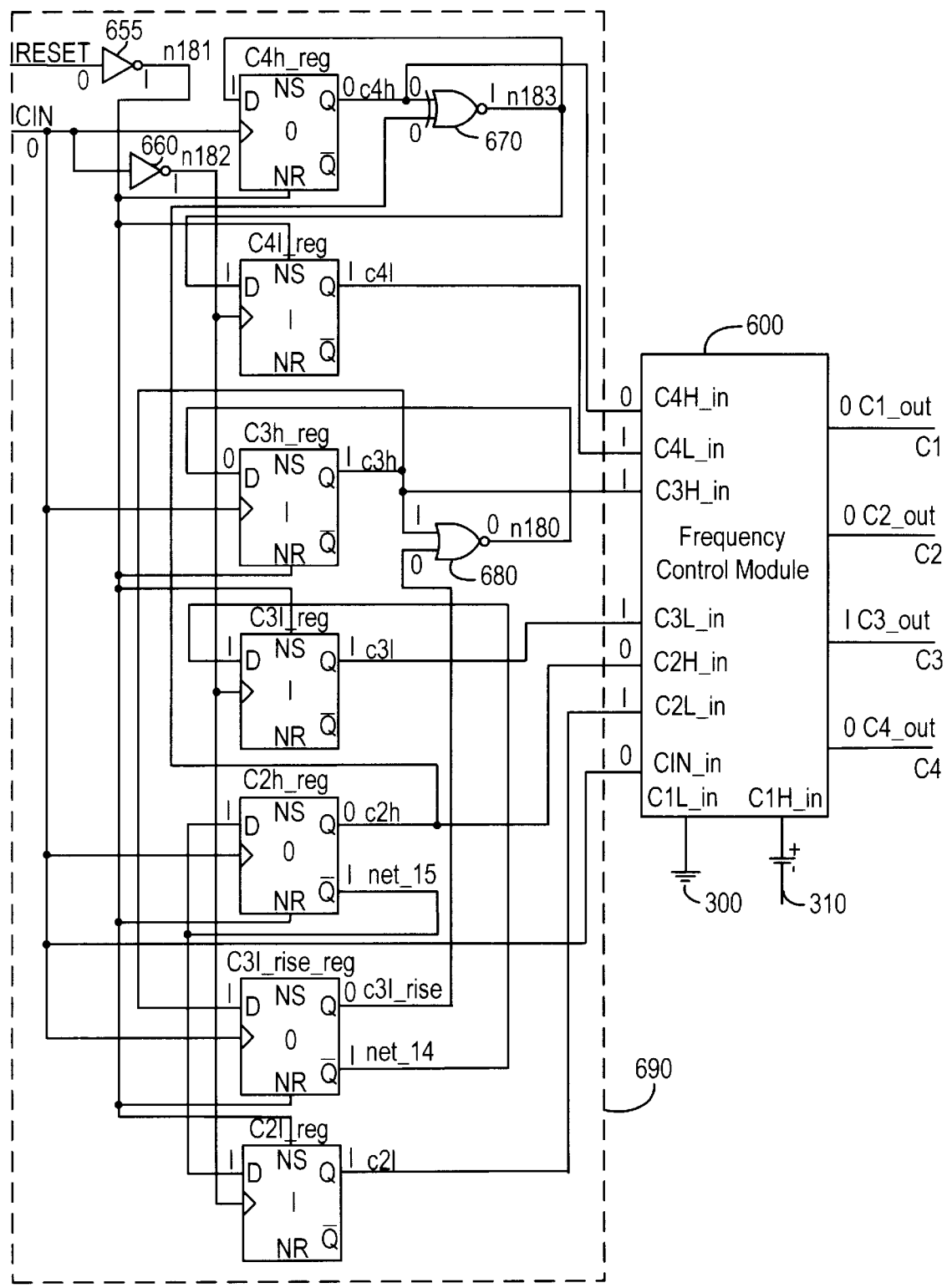
Fig. 6E2

MULTIPLE FREQUENCY CLOCK GENERATION AND SYNCHRONIZATION

CROSS REFERENCE TO APPENDIX INCLUDING A COMPUTER PROGRAM LISTING

Appendix A, which is part of the present disclosure, is an appendix consisting of a one sheet listing of a computer program and related data in one embodiment of this invention. Appendix B, which is part of the present disclosure, is an appendix consisting of one sheet listing of a computer program and related data in one embodiment of this invention. These listings of computer programs contain material which is subject to copyright protection. The copyright owner has no objection to the facsimile reproduction by anyone of the patent document or the present disclosure, as it appears in the Patent and Trademark Office patent files or records, but otherwise reserves all copyright rights whatsoever.

BACKGROUND OF THE INVENTION

1. Field of the invention

The present invention relates generally to integrated circuits and, in particular, to a method of generating multiple frequency clock signals in an integrated circuit.

2. Description of Related Art

Integrated circuits typically include multiple logic devices packaged in a single assembly ("chip"). Each logic device, in turn, comprises one or more logic elements such as gates or single memory elements. Each logic element operates at a given frequency determined by a clock signal. In the context of digital circuits, a clock is a circuit that emits a series of pulses with a precise pulse width and a precise interval between consecutive pulses. Thus, during a pulse a first predetermined voltage, i.e., an active signal is present on a line on which the clock signal is provided, e.g., the signal is high, while at all other times, a second predetermined voltage, e.g., an inactive signal, either no voltage, or a voltage lower than the first predetermined voltage, is present on the line e.g., the signal is low. The transition from the low state to the high state of the signal is referred to as a rising edge of the clock signal, while a transition from the high state of the signal to the low state of the signal is referred to as a falling edge of the clock signal. The interval between consecutive corresponding edges of the clock signal i.e., either between consecutive rising edges or between consecutive falling edges, is the cycle time of the clock signal. The number of cycles of the clock signal occurring in a fixed period of time is the frequency of the clock signal. The duty cycle of a clock signal is the percentage of clock cycle time during which the signal is high, in the example.

To allow synchronization of the operations performed by different logic elements, typically one or more input clock signals are provided which serve as a reference clock signal for all logic elements in the integrated circuit. A logic element may operate at lower or higher frequency than the input clock signal, but its timing relationship to other logic elements is defined in relationship to the timing of the input clock signal.

In some applications, certain logic elements need to operate at a high frequency, while other logic elements only need to operate at a low frequency. Thus, if a single clock signal is provided for all logic elements, the clock signal must have at least the same frequency as the highest frequency required by any logic element in the integrated circuit. However, this results in unnecessary power consumption and increases both the logic area required to accommodate tighter timing constraints and the functional complexity of the logic devices required for high frequency operation.

It is thus desirable to provide multiple frequency clock signals in a single integrated circuit, or a portion of an integrated circuit, having a single input clock. Prior art methods to provide multiple frequency clock signals, however, present several limitations.

An obvious technique for dividing down the input clock signal frequency for each lower frequency output clock signal is to use a counter clocked by the input clock of the integrated circuit. Using this approach, however, the path from an input terminal on which the input clock signal is received to each of the output terminals on which the lower frequency clock signals are provided is routed through a register, whereas the input clock signal is not. As a result, the delay caused by routing the lower frequency output clock signals through registers make it difficult to synchronize the input clock signal with the lower frequency clock signals across the operating range (supply voltage, temperature and integrated circuit process variation) of the integrated circuit.

The synchronization problem can be avoided by using an input clock signal that has a frequency that is twice the desired frequency of the fastest output clock signal. A counter is then used to divide down the frequency of the input clock signal for each output clock signal. Since the delay introduced by the counter is approximately the same for all output clock signals, the output clock signals can be synchronized. The higher frequency source, however, consumes more power and may require the use of an expensive integrated circuit fabrication process.

Another alternative is to gate or mask out some of the input clock signal pulses to generate a lower frequency output clock signal with a duty cycle which is a either a multiple or a fraction of the duty cycle of the input clock signal. FIG. 1 shows the timing for such an implementation for three clock signals, C1, C2a and C2b, where clock signal C1 has the same frequency as the input clock CIN and clock signals C2a and C2b have half the frequency of the input clock signal CIN. Clock signal C1 is generated by routing input clock signal CIN through a logical AND gate together with a logical one signal. Clock signal C2a is generated by routing input clock signal CIN through a logical AND gate together with a masking signal. Clock signal C2b is generated by routing input clock signal CIN and a masking signal through a logical OR gate. Since the delay introduced by the logical AND/OR gates is roughly the same for output clock signals C1, C2a and C2b, this technique allows the output clocks to be synchronized. However, clock signals C2a and C2b have different duty cycles than input clock signal CIN (approximately 25% and 75%, respectively). This may not be suitable for logic elements which require a duty cycle of approximately 50%.

There is thus a need for an improved method and apparatus for generating multiple frequency clock signals.

SUMMARY OF THE INVENTION

The present invention provides a method and apparatus for generating multiple frequency clock signals using a single input clock signal. Each clock signal generated has a cycle time that is an integer multiple of the input clock cycle time. The fastest clock signal, i.e., the clock signal with the highest frequency, generated has the same cycle time as the input clock. The rising edges of all the clock signals generated are synchronized and each clock signal generated has an approximate duty cycle of 50%.

Similar falling edge synchronization can be achieved by introducing a pair of inverters at input and output clock ports.

This is achieved by first applying the input clock signal to an input terminal of a plurality of registers and of a frequency control module of the signal generator, presenting the control signals to input terminals of the registers and of the frequency control module, and generating a plurality of output clock signals in the frequency control module, dependent on the input clock signal and on the control signals.

In one embodiment, the frequency control module includes a plurality of logical AND and OR gates. The input clock signal is provided on an input terminal of one of the AND gates and a signal on an output terminal of the AND gate is provided on an input terminal of one of the OR gates.

BRIEF DESCRIPTION OF THE DRAWINGS

FIGS. 6A–6F are schematic diagrams of a circuit generating a set of control signals for controlling a frequency control module at successive times, according to one embodiment of the invention.

DETAILED DESCRIPTION

According to the principles of this invention, a method and apparatus generate multiple frequency output clock signals from a single input clock signal. The method and apparatus eliminate the limitations of prior art clock generation techniques. First, each output clock signal has a cycle time that is an integer multiple of the input clock cycle time and the fastest output clock signal, i.e., the clock with the highest frequency, has the same cycle time as the input clock signal. Unlike the prior art techniques described above, the rising edges of all output clocks are synchronized, making it easy to synchronize the various clock signals generated across the integrated circuit's operating range. Those skilled in the art will realize how the method and apparatus of the present invention can be modified to provide sychronization of the falling edges rather than the rising edges of all the ouput clocks. Finally, each output clock has an approximate duty cycle of 50%.

Figure 2:
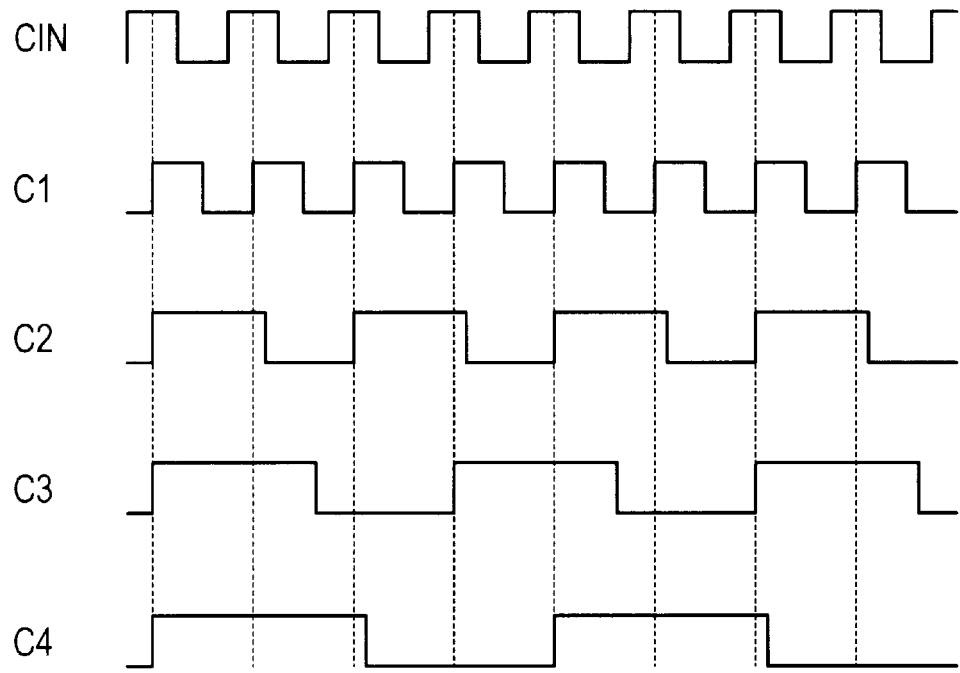
FIG. 2 is a timing diagram of the input and output clock signals of a multiple frequency clock generator according to one embodiment of the invention.

A timing diagram for a multiple clock signal generator, according to one embodiment of the invention is provided in FIG. 2.

In FIG. 2, a single input clock signal CIN from an input clock source (not shown) is used to generate four output clock signals C1, C2, C3 and C4, respectively. As illustrated by the timing diagram of FIG. 2, clock signal C1 has the same frequency as input clock signal CIN; clock signal C2 has half the frequency of input clock signal CIN; clock signal C3 has one third the frequency of input clock signal CIN; and clock signal C4 has one quarter the frequency of input clock signal CIN. In addition, the rising edges of output clock signals C1, C2, C3 and C4 are synchronized, following the rising edge of input clock signal CIN by a uniform predictable time delay determined by the propagation time through a multiple frequency clock generator circuit.

Figure 3:
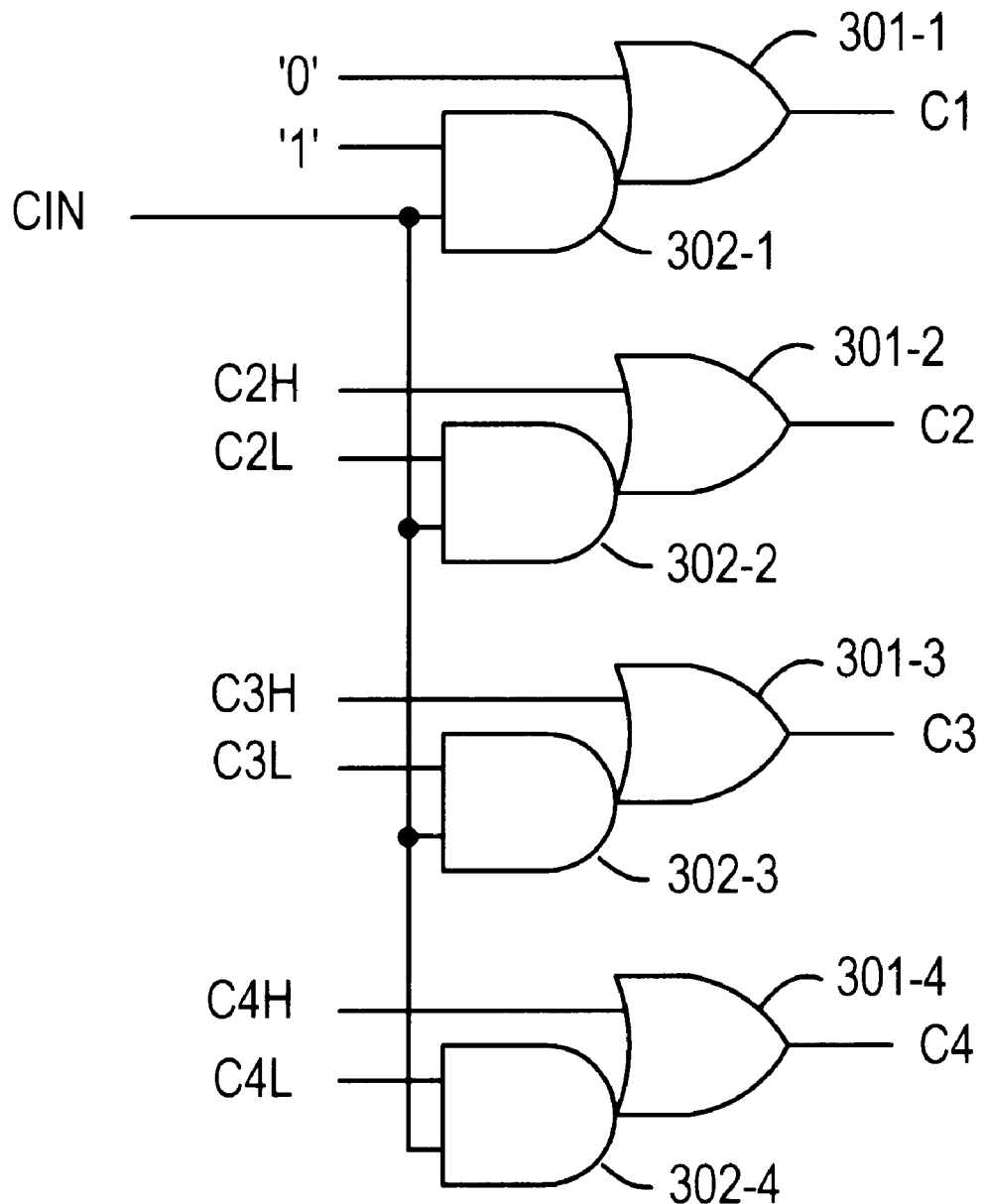
FIG. 3 is a schematic diagram of a frequency control module for generating four frequency clock signals, according to one embodiment of the invention.

Conceptually, each lower frequency output clock signal is generated by gating input clock signal CIN with two clock control signals, CnH and CnL (where n is 1, 2, 3, 4) through an AND-OR gate, as shown in FIG. 3. A first clock control signal CnH is applied to a first input of an OR gate 301_n, i.e., a first logic gate, where n=1, 2, 3, 4. A second clock control signal CnL is applied to a first input terminal of an AND gate 302_n, i.e., a second logic gate, where n=1, 2, 3, 4. Input clock signal CIN is applied to a second input terminal of AND gate 302_n. The output signal of AND gate 302_n drives a second input terminal of OR gate 301_n. The output signal of OR gate 301_n is clock signal Cn.

To prevent glitches on output clock signal Cn, clock control signal CnL is only allowed to transition after a falling edge of input clock signal CIN and before the next rising edge of input clock signal CIN. This guarantees that the output signal of the logic AND gate, to whose input terminals input clock signal CIN and clock control signal CnL are applied, is glitch-free. In addition, clock control signal CnH is only allowed to transition after a rising edge of input clock signal CIN by a time delay exceeding the AND gate propagation delay and before the next falling edge of input clock signal CIN. This guarantees that the signal on the output terminals of each of the AND-OR gazes of FIG. 3, i.e., Cn, is glitch-free.

When a logical one level signal is present on line CnH, output clock signal Cn is forced high irrespective of the state of input clock signal CIN, and when a logical zero level signal is present on line CnL, Cn is forced low unless a logical one level signal is present on line CnH, as shown in the truth table of Table 1.

TABLE 1

| CIN | CnH | CnL | Cn |
| --- | --- | --- | --- |
| 0 | 0 | 0 | 0 |
| 0 | 1 | 0 | 1 |
| 0 | 0 | 1 | 0 |
| 0 | 1 | 1 | 1 |
| 1 | 0 | 0 | 0 |
| 1 | 1 | 0 | 1 |
| 1 | 0 | 1 | 1 |
| 1 | 1 | 1 | 1 |

The timing of signals on lines CnH and CnL is such that a rising edge of output clock signal Cn is always triggered by a rising edge of input clock signal CIN. Since an identical path is used from input clock signal CIN to each of the output clock signals C1–C4, the rising edges of all output clock signals are synchronized. Output clock signal C1 has the same frequency as input clock signal CIN. Thus, clock control signal C1H is tied to a logical zero source and clock control signal C1L is tied to a logical one source so that the waveform for output clock signal C1 is shaped similarly to the waveform for input clock signal CIN.

Figure 4:
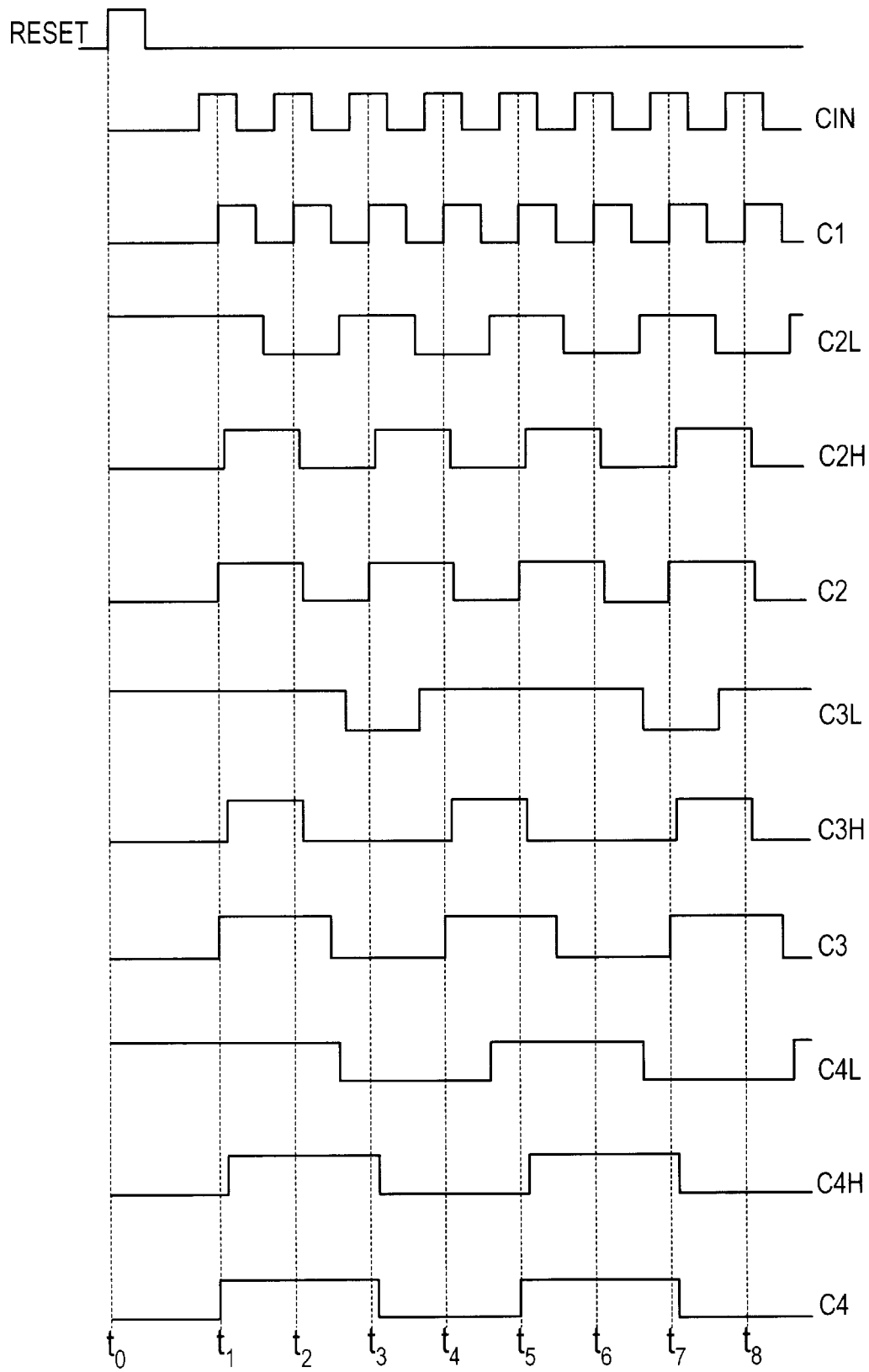
FIG. 4 is a timing diagram of the input and output signals of the frequency control module of FIG. 3.

A timing diagram for input clock signal CIN, output clock signals C1, C2, C3 and C4, and clock control signals C2L, C2H, C3L, C3H, C4L and C4H is shown in FIG. 4. At time t0, a logical one level signal is present on RESET line to initialize clock control signals C2L, C2H, C3L, C3H, C4L and C4H to the levels shown in FIG. 4. At time t1 between a rising edge and the next successive falling edge of input clock signal CIN, clock signal C1 transitions from low to high, the time delay between the rising edge of input clock signal CIN and the rising edge of output clock signal C1 representing the delay introduced by OR gate 301_1 and AND gate 302_1. Also at time t1, clock control signal C2L is high and clock signal C2H is low causing output clock signal C2 to transition from low to high a time delay after the rising edge of input clock signal CIN. The delay between the rising edge of input clock CIN and the rising edge of output clock signal C2 is introduced by gating through OR gate 301_2 and gate 302_2. Note that the rising edge of output clock signal C2 is synchronized with the rising edge of output clock signal C1. Similarly, clock control signals C3L and C4L are high and clock control signals C3H and C4H are low causing output clock signals C3 and C4 to transition from low to high a time delay after the rising edge of input clock signal CIN.

At time t2, also between a rising edge and the next successive falling edge of input clock signal CIN, output clock signal C1 transitions from low to high. Control signals C2H, C3H and C4H are high. As a result, output clock signals C2, C3 and C4 are driven high, as shown by the truth table of Table 1. At time t3, again output clock signal C1 transitions from low to high. Clock control signal C2L is high and clock control signal C2H is low, causing output clock signal C2 to transition from low to high a time delay after the rising edge of input clock signal CIN. Clock control signals C3L and C3H are low driving output clock signal C3 low, as indicated by the truth table of Table 1. Lastly, clock control signal C4H is high driving output clock signal C4 high.

At time t4, output clock signal C1 again transitions from low to high. Clock control signal C2H is high, driving output clock signal C2 high. Clock control signal C3L is high and clock control signal C3H is low, causing output clock signal C3 to transition from low to high a time delay after the rising edge of input clock signal CIN. Lastly, clock control signals C4L and C4H are low, driving output clock signal C4 low. At time t5, output clock signal C1 again transitions from low to high. Clock control signal C2L is high and clock control signal C2H is low, causing output clock signal C2 to transition from low to high a time delay after the rising edge of input clock signal CIN. Clock control signal C3H is high, driving output clock signal C3 high. Lastly, clock control signal C4L is high and clock control signal C4H is low, causing output clock signal C4 to transition from low to high time delay after the rising edge of input clock signal CIN.

As a result, output clock signal C1 has rising edges at times t1, t2, t3, t4 and t5; output clock signal C2 has rising edges at times t1, t3 and t5; output clock signal C3 has rising edges at time; t1 and t4; and output clock signal C4 has rising edges at times t1 and t5. Using the time interval between t1–t2, t2–t3, t3–t4 and t4–t5 as a unit of time, output clock signal C1 as a frequency of 4 rising edges over 4 times intervals, output clock signal C2 has a frequency of 3, output clock signal C3 has a frequency of 2 and output clock signal C4 has a frequency of 1. In addition, inspection of FIG. 4 reveals that the rising edges of output clock signals C1, C2, C3 and C4 are synchronized to one another and that the duty cycle of output clock signals C1, C2, C3 and C4 is approximately 50%.

Figure 5:
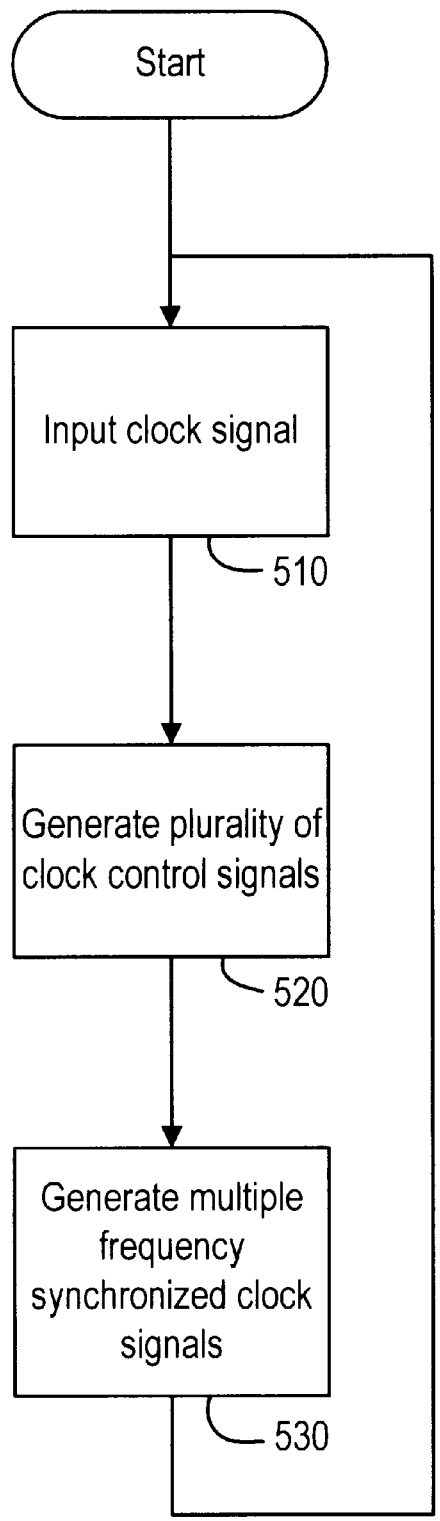
FIG. 5 is a flow diagram of the operation of generating multiple frequency clock signals, according to one embodiment of the invention.

FIG. 5 is a process flow diagram of a method for generating multiple frequency clock signals, according to one embodiment of the invention. In FIG. 5, an input clock signal is first received by a multiple frequency clock generator circuit (not shown) in stage 510. A plurality of clock control signals, such as clock control signals C2L, C2H, C3L, C3E, C4L and C4H of FIG. 4, are then generated by the frequency clock generator circuit in stage 520. Finally, multiple frequency synchronized clock signals are generated by the multiple frequency clock generator circuit in stage 530. Stages 510 through 530 are then repeated.

A multiple frequency generator circuit for generating four varying frequency output clock signals is shown in FIGS. 6A–6F. While the multiple frequency generator circuit of FIGS. 6A–6F is described below for clarity, the present invention is not limited to the specific circuit of FIGS. 6A–6F. Any logic circuit for generating the signals of FIG. 4 can be used in place of the circuit of FIGS. 6A–6F.

Figure 6A:
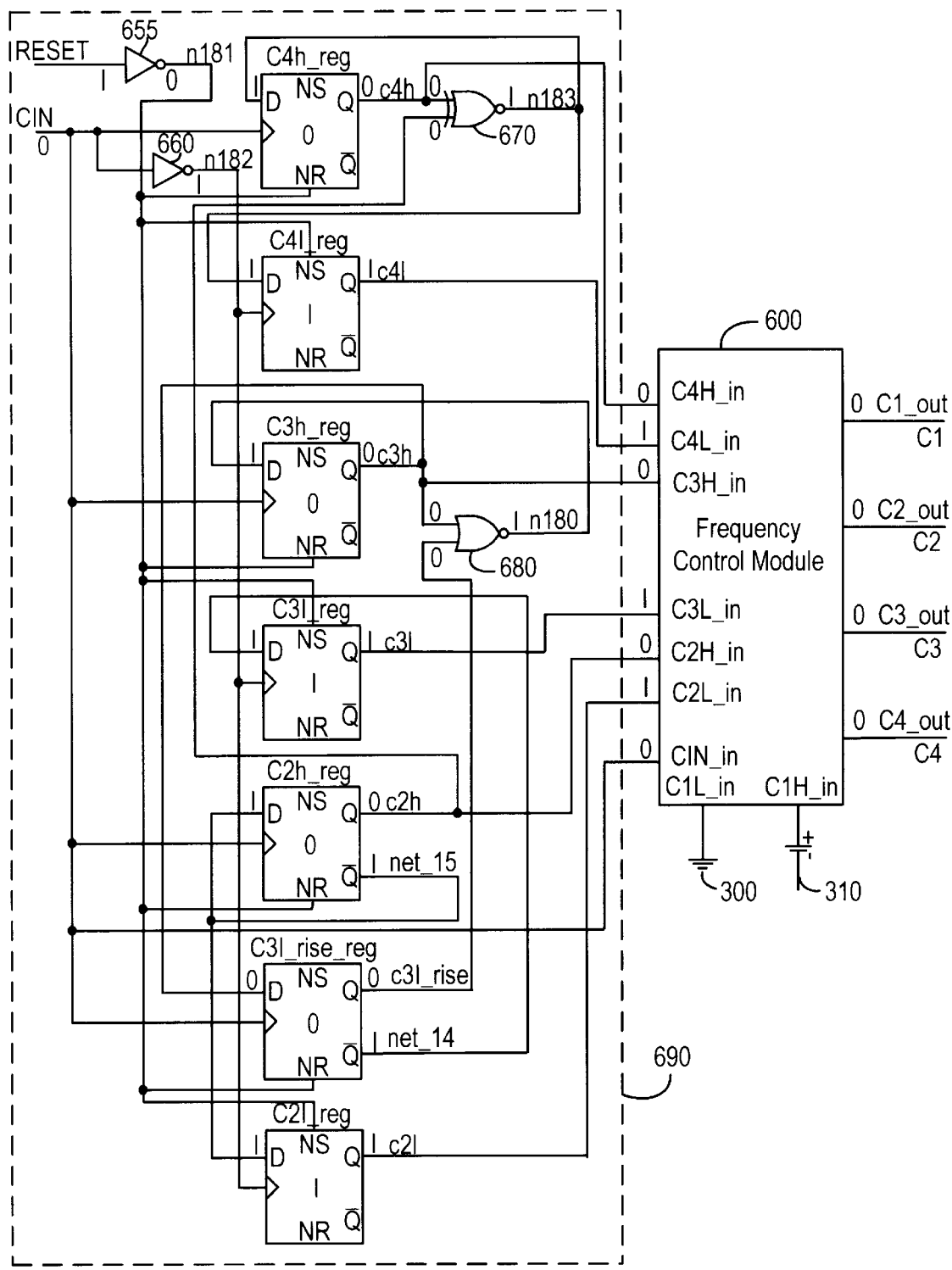

FIG. 6A illustrates one embodiment of a clock control signal generator circuit 690 and a frequency control module 600. Clock control signal generator circuit 690 generates three sets of clock control signals CnL and CnH, where n ranges from 2 to 4. The three sets of clock control signals CnL and CnH are input signals to frequency control module 600. Frequency control module 600 also receives input clock signal CIN, a logic one signal 310, and a logic zero signal 300 as input signals.

As described more completely below, in response to these input signals and the input clock signal CIN, frequency control module 600 generates multiple frequency output clock signals C1 to C4 on clock output lines C1_out, C2_out, C3_out and C4_out, as shown in FIG. 4. In FIG. 4, a clock signal has the same reference numeral as the clock output line carrying that clock's output signal. Output clock signal C1 has the same duty cycle and period as clock input signal CIN. Output clock signal C2 has a period that is twice the period of output clock signal C1 and has approximately a 50% duty cycle. Output clock signal C3 has a period that is three times the period of output clock signal C1 and has approximately a 50% duty cycle. Output clock signal C4 has a period that is four times the period of output clock signal C1 and has approximately a 50% duty cycle.

To generate the three sets on control signals that in turn are used to obtain the plurality of output clock signals, a plurality of registers c31_rise_reg, c21_reg, c2h_reg, c3l_reg, c3h_reg, c4l_reg, and c4h_reg, which in this embodiment are D-type flip-flops, are utilized in clock control signal generator circuit 690. FIGS. 6A–6F show how the signals of FIG. 4 can be generated using the circuit of FIG. 6A. FIG. 6A illustrates the state of the circuit following a rising edge of RESET signal. FIGS. 6B1, 6C1, 6D1, 6E1 and 6F illustrate the state of the circuit after successive rising edges of input clock signal CIN. FIGS. 6B2, 6C2, 6D2 and 6E2, in turn, illustrate the state of the circuit after successive falling edges of input clock signal CIN.

In FIG. 6A, clock control signal generator circuit 690 is placed in a known state by an active signal, which in this embodiment is a logic one signal, on RESET line of circuit 690. The active signal on RESET line drives an inverter 655 which in turn drives the signal on line N181 inactive. The inactive signal on line N181 drives output terminals Q of registers c4h_reg, c3h_reg, c2h_reg, and c3l_rise reg inactive, e.g., low, because line N181 is connected to a negative reset terminal NR of each of registers c4h_reg, c3h_reg, c2h_reg, and c3l_rise_reg. The inactive signal on line N181 drives output terminals Q of registers c4l_reg, c3l_reg, and c2l_reg active, because line N181 is connected to a negative set terminal NS of each of registers c4l_reg, c3l_reg, and c2l_reg.

The inactive signal on terminal Q of register c4h_reg is supplied to a first terminal of a first logic gate 670, which in this embodiment is an Exclusive NOR (XNOR) gate, and to a clock control signal input terminal C4H_in of frequency control module 600 by control line c4h. The inactive signal on terminal Q of register c2h_reg is supplied to a second terminal of XNOR gate 670, and to a clock control signal input terminal C2H_in of frequency control module 600 by control line c2h. The inactive signal generated by XNOR gate 670 in response to the signals on the first and second input terminals drives input terminals D of registers c4l_reg and c4h_reg. The active signal on output terminal Q of register c4l_reg is supplied to a clock control signal input terminal C4L_in of frequency control module 600 by control line c4l.

The inactive signal on terminal Q of register c3h_reg is supplied to a first terminal of a second logic gate 680, which in this embodiment is a NOR gate, to input terminal D of register c3l_rise_reg, and to a clock control signal input terminal C3H_in of frequency control module 600 by control line c3h. The inactive signal on terminal Q of register c3l_rise_reg is supplied to a second terminal of NOR gate 680 by line c3l_rise. The active signal generated by NOR gate 680 in response to the signals on the first and second input terminals drives input terminal D of register c3h_reg.

The active signal on terminal $\overline{Q}$ of register c3l_rise_reg drives input terminal D of register c3l_reg. The active signal on terminal Q of register c3l_reg is connected to a clock control signal input terminal C3L_in of frequency control module 600 by line c3l.

The active signal on terminal $\overline{Q}$ of register c2h_reg drives input terminal D of register c2h_reg, and input terminal D of register c2l_reg. The inactive signal on terminal Q of register c2h_reg is (connected to a control signal input terminal C2H_in of frequency control module 600. The active signal on output terminal Q of register c2l_reg is supplied to a clock control signal input terminal C2L_in.

Figure 7A:
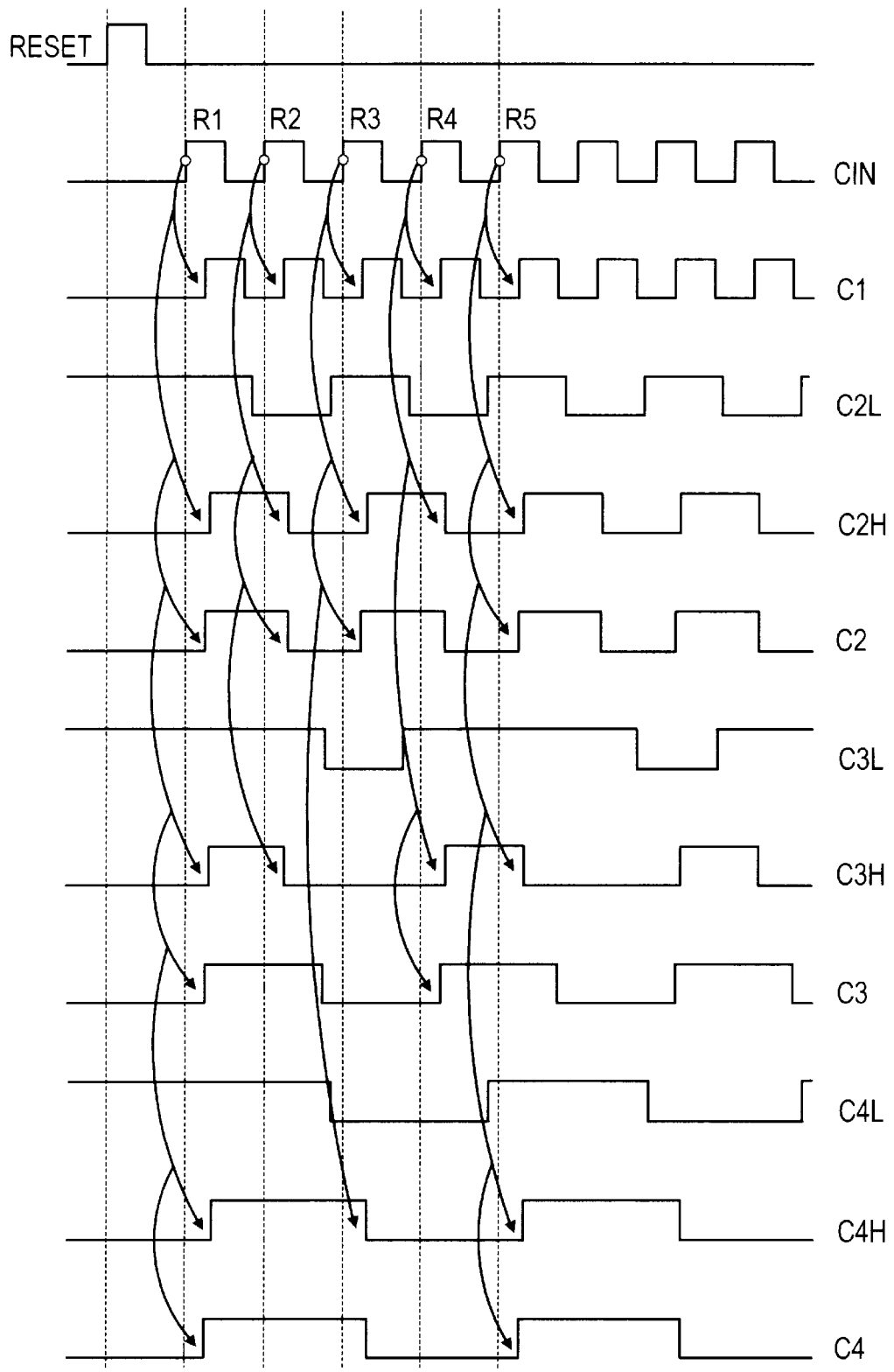
FIGS. 7A–7B are timing diagrams of the signals generated by the circuit of FIGS. 6A–6F.

Rising edge R1 of input clock signal CIN drives rising edges of output clock signals C1, C2, C3 and C4 in a synchronized fashion, as shown by the truth table of Table 1. (As shown in FIG. 7A).

Figure 1:
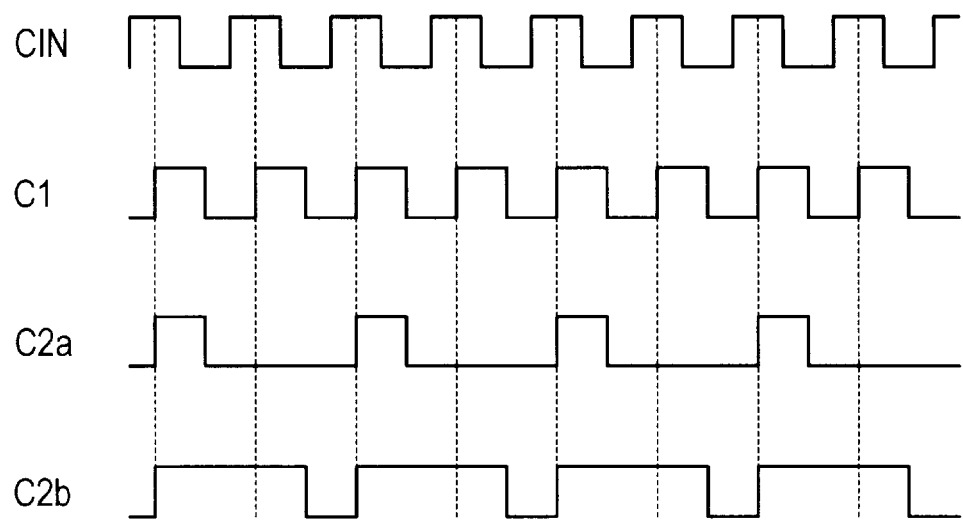
FIG. 1 is a timing diagram of multiple frequency clock signals generated using a prior art method.

As is known to those of skill in the art, a rising edge on the clock terminal of a D-type flip-flop transfers the signal on an input terminal D to output terminal Q and the inverse of the signal on input terminal D to output terminal $\overline{Q}$. Hence, a rising edge of input clock signal CIN clocks registers c4h_reg, c3h_reg, c2h_reg, and c3l_rise_reg. FIG. 6B1 illustrates the state of the circuit after rising edge R1 (FIG. 7A) of input clock signal CIN.

Since an active signal is clocked through register c2h_reg, the signal on input terminal C2H_in goes active and the signal from output terminal $\overline{Q}$ of register c2h_reg to input terminal D of register c2l_reg goes inactive. The signal on one input terminal of XNOR gate 670 also goes active.

The active signal on input terminal D of register c3h_reg is clocked through to output terminal Q by the rising edge of input clock signal CIN and so the signal on terminal C3H_in goes active, and the signals on input terminal D of register c3l_rise_reg and on one input terminal of NOR gate 680 go active.

The inactive signal on input terminal D of register c3l_rise_reg is clocked through to output terminal Q by the rising edge of input clock signal CIN and so the signal on the other input terminal of NOR gate 680 goes inactive. As a result, the signal on an output terminal of NOR gate 680 goes inactive and the signal on input terminal D of register c3h_reg goes inactive The active signal on input terminal D of register c4h_reg is clocked through to output terminal Q by the rising edge of input clock signal CIN and so the signal on terminal C4H_in goes active, and the signal on the other input terminal of XNOR gate 670 goes active. As a result, the signal on an output terminal of XNOR gate 670 goes active and the signal on input terminals D of registers c4h_reg and c4l_reg go active.

Accordingly, rising edge R1 of input clock signal CIN drives rising edges of control signals C2H, C3H and C4H, as shown in FIG. 7A.

Furthermore, a falling edge of input clock signal CIN clocks registers c4l_reg, c3l_reg, and c2l_reg. FIG. 6B2 illustrates the state of the circuit after falling edge F1 (FIG. 7B) of input clock signal CIN.

Figure 7B:
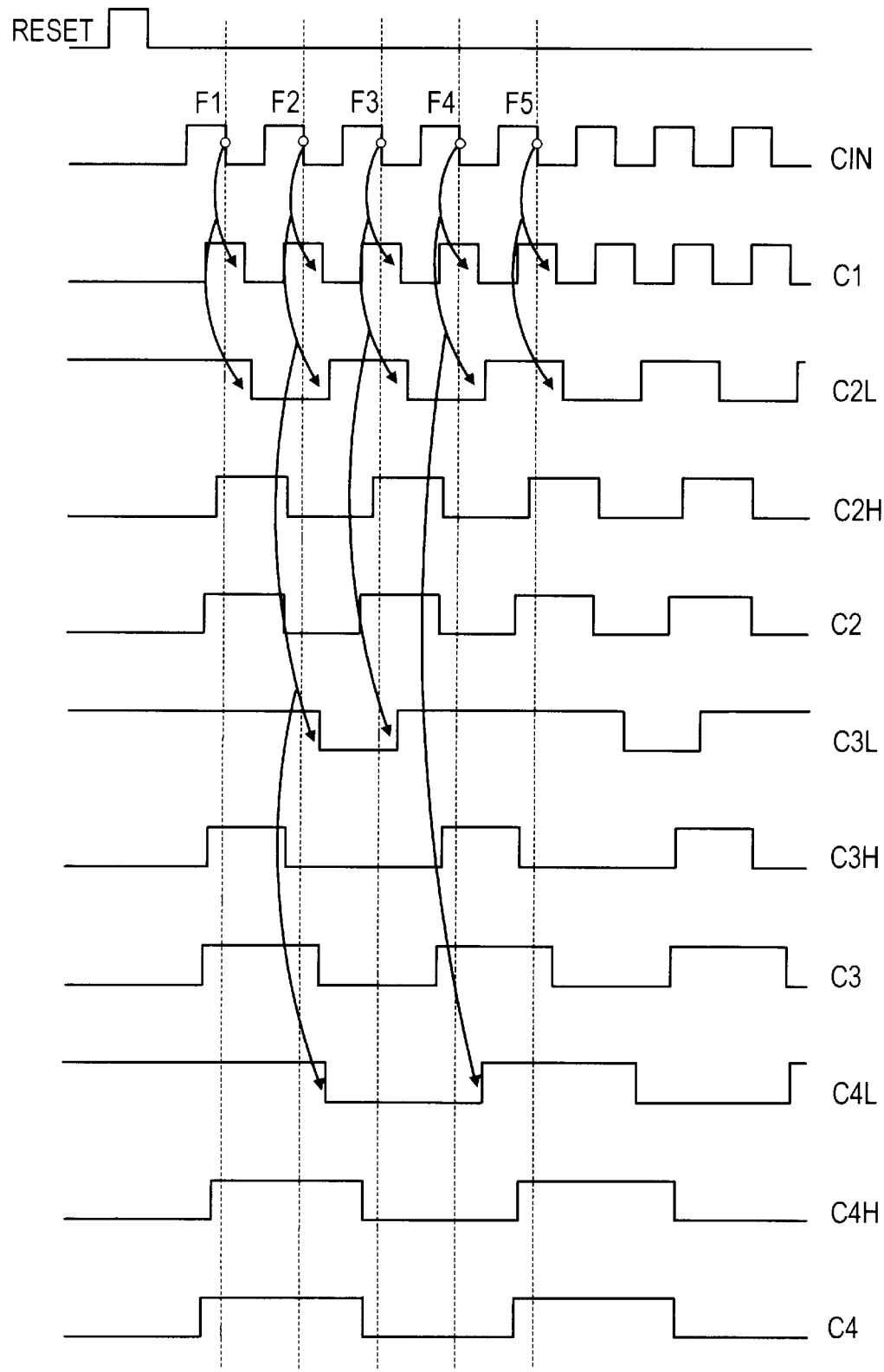

Since an inactive signal is clocked through register c2l_reg, the signal on input terminal C2L_in goes inactive. The active signal on input terminal D of register c3l_reg is clocked through to output terminal Q by falling edge F1 (FIG. 7B) of input clock signal CIN and so the signal on terminal C3L_in goes active. Finally, the active signal on input terminal D of c4l_reg register is clocked through to output terminal Q and the signal on terminal C4L_in goes active. Accordingly, falling edge F1 of input clock signal CIN drives clock control signal C2L inactive, as shown in FIG. 7B. Falling edge F1 also drives the falling edge of clock signal C1.

FIG. 6C1 illustrates the state of the circuit after rising edge R2 (FIG. 7A) of input clock signal CIN. Rising edge R2 drives the rising edge of clock signal C1. By a process similar to the one described above with respect to FIGS. 6A–6B2, rising edge R2 drives clock control signals C2H and C3H inactive. As a result, output clock signal C2 becomes inactive, while clock signal C3 remains active since clock control signal C3L and input clock signal CIN are active.

Similarly, falling edge F2 (FIG. 7B) of input clock signal CIN drives a rising edge of clock signal C1. It also drives clock control signal C2L active and clock control signals C3L and C4L inactive, as shown in FIG. 6C2. As a result, clock signal C3 goes inactive. Rising edge R3 (FIG. 7A) of clock signal CIN drives rising edges of clock signals C1 and C2 in a synchronized fashion. In addition, rising edge R3 (FIG. 7A) of input clock signal CIN drives clock control signal C2H active and clock control signal C4H inactive, as shown in FIG. 6D1. As a result, output clock signal C4 becomes inactive.

Figure 6F:
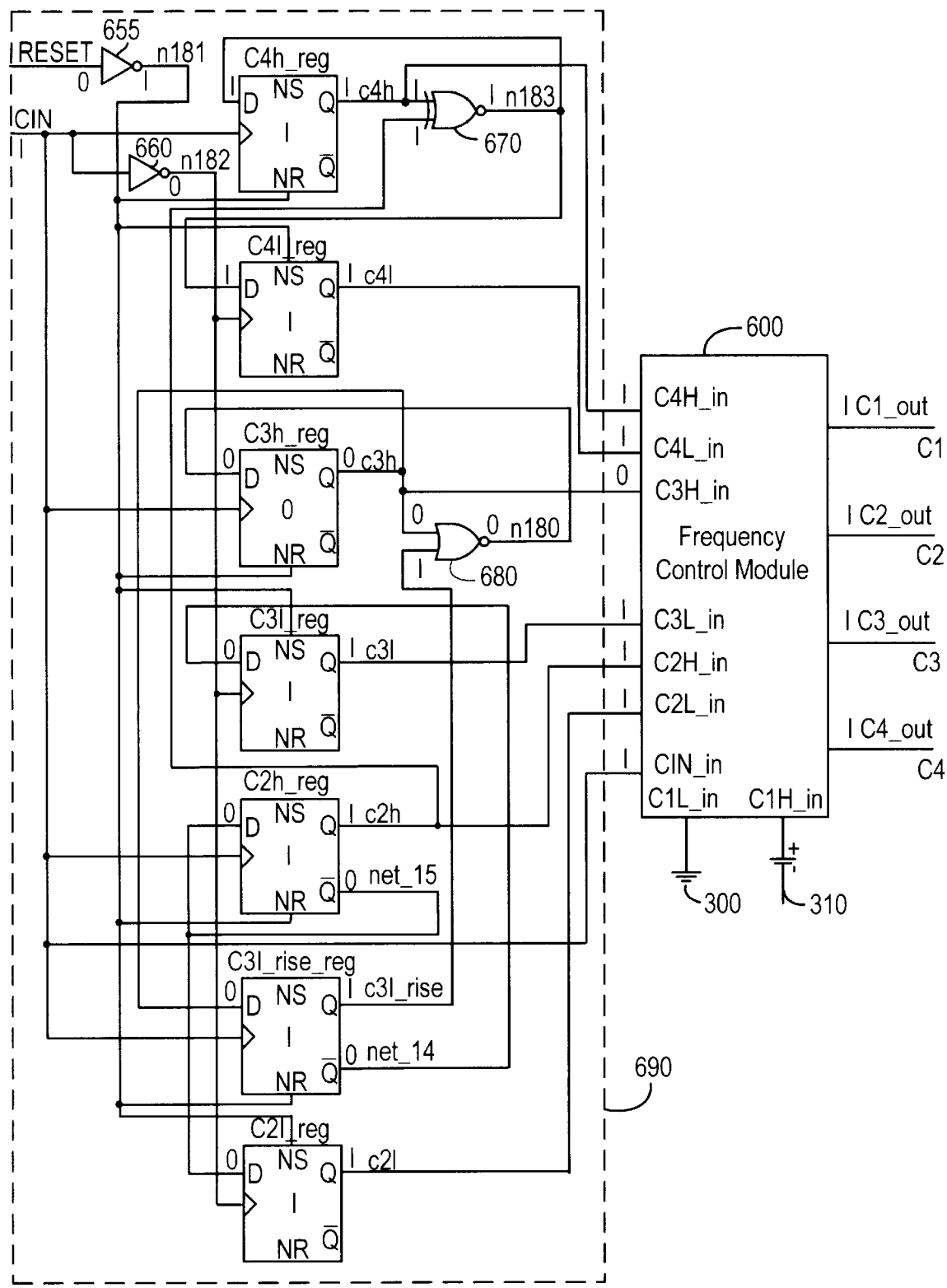

Falling edge F3 (FIG. 7B) of input clock signal CIN drives clock signal C1 inactive, clock control signal C2L inactive and clock control signal C3L active, as shown in FIG. 6D2. Rising edge R4 (FIG. 7A) of input clock signal CIN drives rising edges of clock signal C1 and C3 in synchronization. It also drives clock control signal C2H inactive and clock control signal C3H active, as shown in FIG. 6E1. As a result, output clock signal C2 becomes inactive. Falling edge F4 (FIG. 7B) of input clock signal CIN drives falling edge of clock signal C1. It also drives clock control signals C2L and C4L active, as shown in FIG. 6E2. Finally, rising edge R5 (FIG. 7A) of input clock signal CIN drives rising edges of C1, C2 and C4 in synchronization, clock control signals C2H and C4H active and clock control signal C3H inactive, as shown in FIG. 6F.

FIGS. 7A–7B illustrate the timing relationship of the signals generated by the circuit of FIGS. 6A–6F. Note that the timing relationship among the signals of FIGS. 7A–7B are similar to the timing relationship among the signals of FIG. 4.

Figure 8:
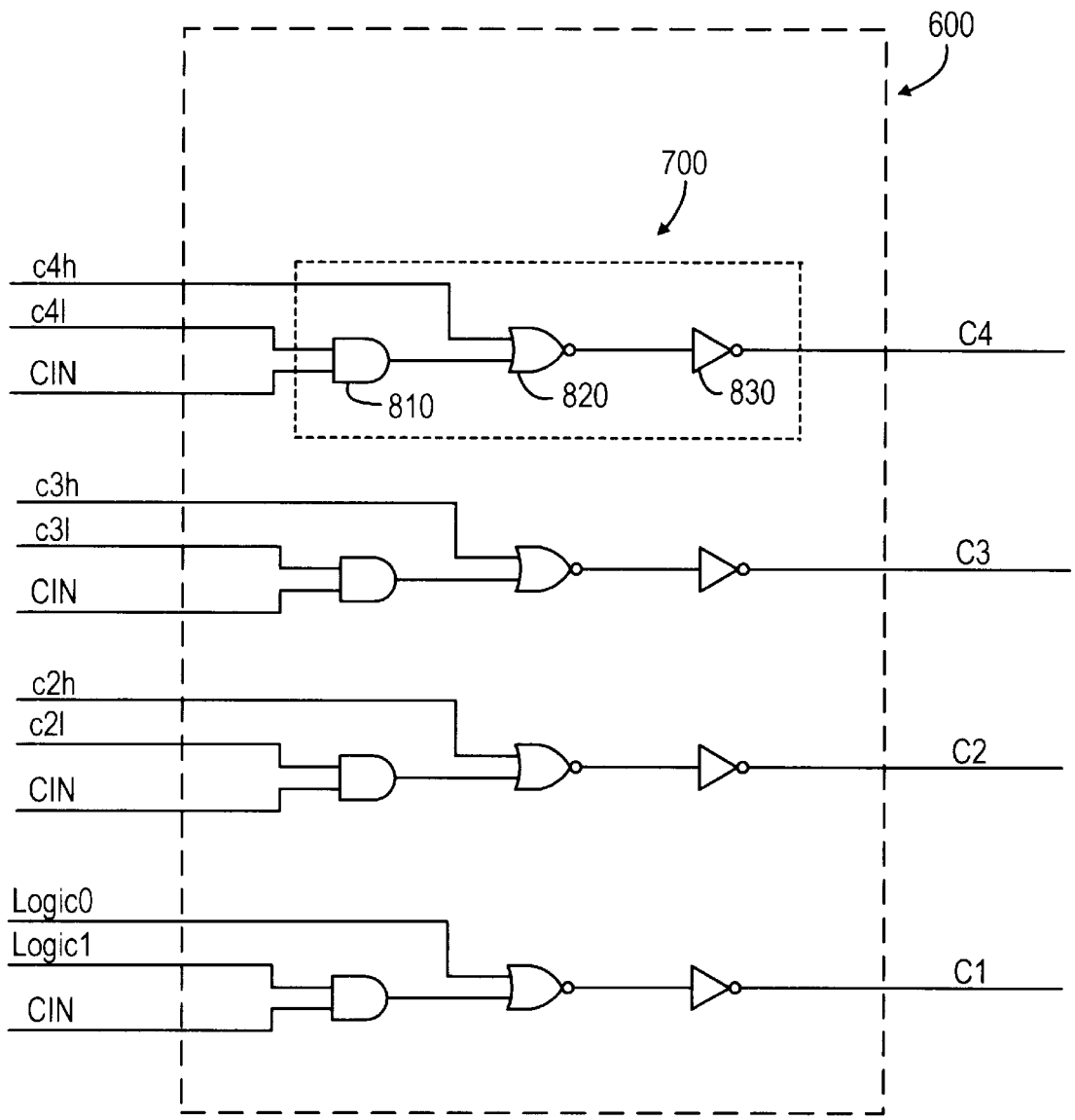
FIG. 8 is a schematic diagram of the frequency control module of FIGS. 6A–6F.

FIG. 8 shows a circuit for implementing the function of frequency control module 600 of FIGS. 6A–6F. The circuit includes four subcircuits 800, each having an AND gate 810, a NOR gate 820, and an inverter 830. Input clock signal CIN and clock control signals CnH and CnL, where n=1, 2, 3, 4, are provided on input terminals of the subcircuit and an output clock signal Cn is present on an output terminal of the subcircuit. For example, in FIG. 8, a line on which input clock signal CIN is provided and line c41 are connected to input terminals of AND gate 810. An output terminal of AND gate 810 is connected to an input terminal of NOR gate 820. The other input terminal of NOR gate 820 is tied to line c4h and an output terminal of NOR gate 820 is connected to an input terminal of inverter 830. Output clock signal C4 is thus generated on an output terminal of inverter 830. The remaining subcircuits operate similarly to generate output clock signals C3, C2, and C1 (the control signals for output clock signal C1 are provided by logical zero source 300 and logical one source 310, respectively).

Thus, output clock signal C4 is high when either clock control signal C4H is high or when both input clock signal CIN and clock control signal C4L are high, as shown by the timing diagrams of FIGS. 7A–7B. Likewise, output clock signal C3 is high when either clock control signal C3H is high or when both input clock signal CIN and clock control signal C3L are high, output clock signal C2 is high when either clock control signal C2H is high or when both input clock signal CIN and clock control signal C2L are high. Finally, output clock signal C1 is high when input clock signal CIN is also high. Thus, the circuit of FIG. 8 performs the same logical function as the circuit of FIG. 3.

As it can be readily observed from the timing diagrams of FIGS. 7A–7B, even though output clock signal C1 has virtually the same waveform as input clock signal CIN, output clock signal C1 has the same timing delay with respect to input clock signal CIN as the other output clock signals (C2, C3 and C4). This is due to the fact that all output clock signals follow similar paths through the circuits of FIGS. 6A–6F and 8, thus causing any delays with respect to input clock signal CIN introduced into the output clock signals to be virtually identical.

The circuits of FIGS. 6A–6F and 8 are also described by the VERILOG code listing provided in Appendices A and B. The logic devices used in Appendix B are summarized in Table 2 below.

TABLE 2

Cell Description

| Cell | Description |
|---|---|
| aoi21 | 2/1 And-Or-Invert |
| inv01 | Inverter |
| ndc0rb | D flip-flop with asynchronous reset |
| ndc0sb | D flip-flop with asynchronous set |
| xnor02 | 2-input exclusive Nor |
| nor02 | 2-input Nor |
| pwr | Connection to logic 1 |
| gnd | Connection to logic 0 |

Embodiments described above illustrate but do not limit the invention. In particular, the invention is not limited to any number of lower frequency output clock signals generated from the input clock signal. Even though a four output clock signal generator has been described, those skilled in the art understand how the method of the present invention can be applied to generators having more than four output clock signal frequencies. Further, different combinatorial logic may be used to implement the circuits of FIGS. 6A–6F and 8. For example, AND-OR gate subcircuits may be used in lieu of AND-NOR-INVERT subcircuits. Other embodiments and variations are within the scope of the invention, as defined by the following claims.

APPENDIX A

```
module clk_skew ( cin, reset, c1, c2, c3, c4, );
input cin, reset;
output c1, c2, c3, c4;
    wire c4_, c2_, c4h, c4l, c2h, c21, Logic0,
Logic1, n180, n181,
n182, n183,
        c3_c1_, c3h, c31_rise, net_14, net_15;
    ndc0rb c4h_reg ( .D(n183), .C(cin), .NR(n181),
.Q(c4h) );
    ndc0sb c41_reg ( .D(n183), .C(n182), .NS(n181),
.Q(c4l) );
    ndc0rb c3h_reg ( .D(n180), .C(cin), .NR(n181),
.Q(c3h) );
    ndc0sb c31_reg ( .D(net_14), .C(182), .NS(n181),
.Q(c31) );
    ndc0rb c2h_reg ( .D(net_15), .C(cin), .NR(nl8l),
.Q(c2h),
            .NQ(net_15) );
    ndc0rb     c31_rise_reg         (      .D(c3h),
.C(cin),.NR(n181),.Q(c31_rise),
            .NQ(net_14) );
    ndc0sb c21_reg ( .D(net_15), .C(n182), .NS(n181),
.Q(c21) );
    xnor02 U50 ( .A(c2h), .B(c4h), .NQ(n183) );
    nor02 U51 ( .A(c3h), .B(c31_rise), .NQ(n180) );
    pwr U52 ( .PWR(Logic1) );
    gnd U53 ( .GND(Logic0) );
    inv01 U54 ( .A(cin), .NQ(n182) );
    inv01 U55 ( .A(reset), .NQ(n181) );
    aoi21 prim_c4a   ( .A1(cin), .A2(c41), .B(c4h),
.NQ(c4_) );
    inv01 prim_c4b ( .A(c4_), .NQ(c4) );
    aoi21 prim_c3a ( .A1(cin), .A2(c31), .B(c3h),
.NQ(c3_) ;
    inv01 prim_c3b ( .A(c3_), .NQ(c3) );
    aoi21 prim_c2a ( .A1(cin), .A2(c21), .B(c2h),
.NQ(c2_) );
    aoi21     prim_c1a    (    .A1(cin),    .A2(Logic1),
.B(Logic0), .NQ(c1_) );
    inv01 prim_c1b ( .A(c1_), .NQ(c1) );
endmodule
```

APPENDIX B

```
// clock circuit that produces rising-edge aligned
outputs
// at 1/1. ½, ⅓, and ¼ frequencies of input
clock
module clk_skew (cin, reset, c1, c2, c3, c4);
inputcin; // input clock
inputreset;
output    c1,      // same frequency as cin
          c2,      // ½ frequency of cin
          c3,      // ⅓ frequency of cin
          c4;      // ¼ frequency of cin
// registers clocked by rising edge of 'cin' and
asynchronously
// cleared by 'reset'
reg     c2h,              // forces c2 high when 1
        c3h,              // forces c3 high when 1
        c31_rise,         // input for c31 register
        c4h;              // forces c4 high when 1
always @(posedge cin or posedge reset)
```

APPENDIX B-continued

```
    if (reset)
    begin
        c2h <= 1'b0;
        c3h <= 1'b0;
        c3l_rise <= 1'b0;
        c4h <= 1=b0;
    end
    else // posedge cin
    begin
        c2h <= ~c2h;
        c3h <= ~c3h & ~c3l_rise;
        c3l_rise <= c3h;
        c4h <= ~(c2h ^ c4h)
    end
// registers clocked by falling edge of 'cin' and
asynchronously
// set by 'reset'
reg     c21,            // forces c2 low when 0
        c31,            // forces c3 low when 0
        c41;            // forces c4 low when 0
always @(negedge cin or posedge reset)
    if (reset)
    begin
        c21 <= 1'b1;
        c31 <= 1'b1;
        c41 <= 1'b1;
end
else // negedge cin
begin
    c21 <= ~c2h;
    c31 <= ~c31_rise;
    c41 <= ~(c2h ^ c4h);
end
// Generate output clocks
wire c1_, c2_, c3_, c4_;// inverted c1-c4
aoi21 prim_cla ( .A1(cin), .A2(1'b1), .B(1'b0),
NQ(c1_) );
aoi21 prim_2a ( .A1(cin), .A2(c21), .B(c2h), .NQ(c2_)
);
aoi21 prim_c3a ( .A1(cin), .A2(c31), .B(c3h), .NQ(c3_)
);
aoi21 prim_c4a ( .A1(cin), .A2(c41), .B(c4h), .NQ(c4_)
);
inv01 prim_c1b ( .A(c1_), .NQ(c1) );
inv01 prim_c2b ( .A(c2_), .NQ(c2) );
inv01 prim_c3b ( .A(c3_), .NQ(c3) );
inv01 prim_c4b ( .A(c4_), .NQ(c4) );
endmodule
```

We claim:

1. A multiple frequency clock signal generator, comprising:

an input terminal receiving a single input clock signal;

a plurality of output terminals, each output terminal providing an output clock signal; and circuitry coupling the input terminal to the output terminals;

wherein:

at least one output clock signal has a cycle time that is equal to a cycle time of the input clock and each of the remaining clock signals is an integer multiple of the cycle time of the input clock;

at least one edge of each output clock signal is synchronized with corresponding edges of the plurality of output clock signals;

an output clock signal having a highest frequency of the plurality of output clock signals has a same frequency as the input clock signal; and each output clock signal has an approximate duty cycle of 50%.

2. A multiple frequency clock signal generator comprising:

a plurality of registers, an input clock signal being provided on an input terminal of one or more of the registers; and a frequency control module operatively coupled to the plurality of registers, one or more of the output clock signals being provided on one or more output terminals of the frequency control module, the frequency control module comprising:

a plurality of logical AND gates;

a plurality of logical NOR gates; and a plurality of inverters;

wherein the input clock signal is provided on an input terminal of a first AND gate, an output of the first AND gate is connected to an input terminal of one of the NOR gates and an output terminal of the NOR gate is connected to an input terminal of one of the inverters.

3. A method for generating multiple frequency clock signals using a single input clock signal, comprising:

applying an input clock signal to a clock input terminal of each of a plurality of registers and to a frequency control module;

presenting a plurality of input control signals to the input terminals of the registers;

providing output control signals on output terminals of the registers to input terminals of the frequency control module; and generating in the frequency control module a plurality of output clock signals, dependent on the input clock signal and on the input and output control signals;

wherein at least one output clock signal has a cycle time that is equal to a cycle time of the input clock and each of the remaining clock signals is an integer multiple of the cycle time of the input clock.

4. The method of claim 3, wherein at least one edge of each output clock signal is synchronized with corresponding edges of the plurality of output clock signals.

5. The method of claim 4, wherein the output clock signal having a highest frequency of any of the plurality of output clock signals has a same frequency as the input clock signal.

6. The method of claim 5, wherein each output clock signal has an approximate duty cycle of 50%.

* * * * *